(12) United States Patent
Andreu et al.

(10) Patent No.: US 11,474,508 B2
(45) Date of Patent: Oct. 18, 2022

(54) PROJECTION METHODS TO IMPOSE EQUALITY CONSTRAINTS ON ALGEBRAIC MODELS

(71) Applicant: AspenTech Corporation, Bedford, MA (US)

(72) Inventors: Victoria Gras Andreu, Cambridge, MA (US); Sven Serneels, Waltham, MA (US); Dimitrios Varvarezos, Houston, TX (US)

(73) Assignee: AspenTech Corporation, Bedford, MA (US)

( * ) Notice: Subject to any disclaimer, the term of this patent is extended or adjusted under 35 U.S.C. 154(b) by 212 days.

(21) Appl. No.: 16/945,202

(22) Filed: Jul. 31, 2020

(65) Prior Publication Data
US 2022/0035353 A1 Feb. 3, 2022

(51) Int. Cl.
*G05B 19/418* (2006.01)
*G05B 23/02* (2006.01)
*G06F 17/13* (2006.01)
*G06F 17/18* (2006.01)

(52) U.S. Cl.
CPC . *G05B 19/41885* (2013.01); *G05B 19/41865* (2013.01); *G05B 23/0254* (2013.01); *G06F 17/13* (2013.01); *G06F 17/18* (2013.01)

(58) Field of Classification Search
None
See application file for complete search history.

(56) References Cited

U.S. PATENT DOCUMENTS

2016/0147202 A1    5/2016  Weiss

FOREIGN PATENT DOCUMENTS

WO    2022026121 A1    2/2022

OTHER PUBLICATIONS

Orth, Jeffrey D., Ines Thiele, and Bernhard Ø. Palsson. "What is flux balance analysis?." Nature biotechnology 28.3 (2010): 245-248. (Year: 2010).*
Boyd, et al., "Convex Optimization", Cambridge University Press, 2004, 730 pages.
Mah, Richard S.H., "Chemical Process Structures and Information Flows", Butterworth Publishers, 1990, 499 pages.
(Continued)

*Primary Examiner* — Carlos R Ortiz Rodriguez
(74) *Attorney, Agent, or Firm* — Hamilton, Brook, Smith & Reynolds, P.C.

(57) ABSTRACT

Computer implemented methods and systems incorporate physics-based and/or chemistry-based constraints into a model of a chemical, physical, or industrial process. The model is derived from a representative dataset of the subject process. The constrained model provides predictions of process behavior that are guaranteed to be consistent with incorporated constraints such as mass balances, atom balances, and/or energy balances while being less computationally intensive than equivalent first principle models. The constrained model can be constructed by matrix multiplication, namely multiplying the solution of an unconstrained linear model by a matrix that enforces the constraints. Improved process control models result, as well as improved process modeling and simulation models result.

36 Claims, 9 Drawing Sheets

(56) References Cited

OTHER PUBLICATIONS

Dmitry Panchenko, "18.650 Statistics for Applications", Fall 2006. Massachusetts Institute of Technology: MIT OpenCourseWare, https://ocw.mit.edu, License: Creative Commons BY-NC-SA.
International Search Report and Written Opinion for PCT/US2021/040252 dated Oct. 21, 2021, entitled "Projection Methods to Impose Equality Constraints on Algebraic Models".
Vasebi, et al., "Selecting proper uncertainty model for steady-state data reconciliation—Application to mineral and metal processing industries", Minerals Engineering, Elsevier, Amsterdam, N L, vol. 65, Jun. 26, 2014, pp. 130-144, XP029010820, ISSN: 0892-6875, DOI: 10.1016/J.MINENG.2014.06.001, the whole document.
"Parallel solution of the pooling problem with application to the Cell Broadband Engine Architecture", IEEE, Piscataway, NJ, USA, Jul. 6, 2009, pp. 354-359, XP031519756, ISBN: 978-1-4244-4135-8, Section 3.
Hodouin, Daniel, "Process Observers and Data Reconciliation Using Mass and Energy Balance Equations", Jan. 1, 2010, Springer, XP055273741, ISSN: 1430-9491 ISBN: 978-1-85233-959-3, pp. 15-83, DOI: 10.1007/978-1-84996-106-6_2, p. 15—p. 28, p. 33—p. 34, p. 38, last paragraph—p. 52, paragraph 2.
Chia, Tien-Li, "Parameter identificastion and state estimation of constrained systems", May 1, 1985, pp. 1-142, XP055850385, Ann Arbor, United States, Retrieved from the Internet: URL:https://www.proquest.com/docview/303339105?accountid=29404, pp. 3-5, pp. 14-54.

\* cited by examiner

PROJECTION METHODS TO IMPOSE EQUALITY CONSTRAINTS ON ALGEBRAIC MODELS

BACKGROUND

Industrial plants such as oil refineries, chemical complexes, and process industries in general use mathematical models to predict, quantify, calculate, and control chemical reactions and processes. Regression models are used to estimate the relationship between independent and dependent variables of a dataset, such as the inputs and outputs of a physical process, chemical reaction or process, or more generally a process engineering system construct. Regression models should satisfy physical or chemical conservation laws as constraints imposed by the underlying properties of the systems (chemical or industrial processes) they model. For example, such conservation laws include mass balance equations that assert that the mass entering a system must equal the mass leaving it, or atom balance equations that assert the mass of an atom present in elements entering the system must equal the mass of the individual atoms in elements leaving it. Regression models should further satisfy gain constraints, constraints that apply to the first derivative of the model (dy/dz) of the model representing a physical system. For example, temperature changes after valve openings should increase in a smooth manner without sudden jumps or unexplained oscillations. Prior art data driven machine learning models fail to preserve these essential physical, chemical, or other engineering properties and produce unfeasible predictions such as an increase of mass in the system or significant instant temperature fluctuations. Thus, there exists a need for improved techniques in modeling chemical reactions and industrial processes and improved models of corresponding processes and systems.

SUMMARY

Embodiments of the present invention address the foregoing shortcomings of the art. To create a better and more accurate model of chemical/industrial reactions, processes, and systems, Applicant's approach includes domain specific knowledge, and in particular includes model constraints that preserve physical properties and gain constraints, without disrupting the nature of the model and its performance.

Linear regression models find linear approximations of the response (dependent) variables with respect to the predictor (independent) variables in a dataset. Specifically, linear regression models presume that the relationship between the independent variables and dependent variables is linear and determine the closest hyperplane that best fits the data. The hyperplane can be defined by a set of equations, one equation $y_n$ for each dependent variable, where each equation is the sum of product pairs, namely all the independent variables multiplied by respective coefficients: $y_n = C_1 x_1 + C_2 x_2 + \ldots C_m x_m$ where n is the number of dependent variables and m is the number of independent variables. Datasets for chemical processes can be used to create linear (or non-linear) regression models that provide useful information about that subject chemical process. Once created, a linear regression model can "predict" the value of a dependent variable based upon independent variables. In other words, predictions are the projections of dependent variable data points onto the hyperplane spanned by the predictor variables. Different linear regression models create different hyperplanes, that is, different coefficients of the independent variables based on their definition of "close." For instance, in the case of Ordinary Least Squares, the closest hyperplane is defined as the one that minimizes the Euclidean distance between a known dependent variable and its corresponding prediction. When applied to chemical processes, linear regression models help predict future behavior of a chemical process. Predictions from regression models are used in process control and other key functions of industrial plants.

If a dataset satisfies linear constraints it can be shown that the predictions of a linear model of the dataset should also satisfy the constraints. Unfortunately, due to errors in measurement, noise, or numerical computational errors, this is usually not the case. Moreover, some constraints might not be linear, in which case they will not be preserved in a linear model. Thus, a need exits to modify existing methods to generate linear regression models that incorporate equality and gain constraints while preserving, as much as possible, the nature of the original model. Specifically, there is a need to produce a constrained regression model (either linear or non-linear) using a dataset that also satisfies a set of constraint equations based on the equality and/or gain constraints.

Some prior art methods have tried to incorporate constraints into models using numerical optimization. Such an approach, while valid on some types of constraints, cannot be applied directly in many situations. While there are some linear and nonlinear solvers that allow a user to directly specify what are the constraints of a generated model, in the case of equality constraints such as mass, atom, or energy balances, the total number of equations that a model needs to satisfy is equal to the number of data points multiplied by the number of balances in the system. Since there are a lot more equality constraint equations than unknowns, numerical optimizers cannot find a solution. Another prior art approach for incorporating equality constraints is to add a penalty term into the loss function to penalize constraint violation. This approach ensures that predictions are close to meeting the constraint but in general it cannot ensure they are satisfied up to a desired small tolerance. Many constraints are fundamental properties of matter and therefore must be satisfied exactly at all times. Furthermore, while the prior art approaches mentioned above may sometimes produce a satisfactory result for the data used to generate the model, neither can guarantee that the constraints would be met when the model is applied to future data.

The present invention provides embodiments (e.g., methods, systems, and techniques) that incorporate equality constraints into a regression model in a very simple and efficient way at the fundamental model construction level. Embodiments of the invention can produce both linear regression models and non-linear regression models. Applicant's approach is simple because some embodiments consist of constructing a linear map by multiplying the solution of the unconstrained linear model, in the form of a coefficient matrix, by a matrix that enforces the constraints. It is efficient since it can use the power of available software or a working program package to construct the coefficient matrix of the unconstrained problem. When applied in the chemical/process industry, embodiments of the present invention are capable of constructing fast and reliable models of chemical/industrial processes or systems where the models are able to generate data and predict outcomes that respect crucial physical constraints such as mass balances, atom balances, and/or energy balances.

One embodiment provides a computer implemented method of generating an improved predictive model of a chemical process. As a first step, a processor receives data representing a subject chemical process in an industrial plant. The data includes independent variables and dependent variables. Next, the processor receives at least one linear constraint equation having constraint equation coefficients. The received linear constraint equation(s) represent one or more physical properties of the subject chemical process. The method continues by constructing a constraint matrix composed of the constraint equation coefficients. A next step constructs a coefficient matrix including potential coefficients for each dependent variable. The potential coefficients define a linear relationship between the independent variables and the dependent variable. Next the method defines, as constrained coefficients, potential coefficients that make the product of the constraint matrix and the coefficient matrix zero. A last step generates an algebraic model having model coefficients that define an algebraic relationship between the independent variables and each dependent variable. The model generation step employs the constrained coefficients as the model coefficients. The resulting algebraic model provides improved predictions of behavior of the subject chemical process that conform to the one or more physical properties thereof.

The chemical process in more general terms may be any physics-based or chemistry-based process, such as but not limited to, a chemical reaction, a transformation of interest in a processing system, a portion of an industrial process, operation of a production unit of the industrial plant, and/or operating physics of a specific piece of equipment in the industrial plant. The industrial plant may be a refinery, chemical manufacturing, pharmaceutical manufacturing, personal and home care manufacturing, nutrition manufacturing, or any similar process industry facility. The generated model may be used for process control of the chemical/industrial process (i.e., subject physics-based or chemistry-based process), used to optimize the subject process, and/or used to design the subject process or related system. The algebraic model may be linear and generated using at least one of an ordinary least squares' regression, ridge regression, LASSO regression, partial least squares regression, or elastic net regression.

The coefficient matrix may be a vertical block matrix having (i) an identity matrix as an upper block, and (ii) a matrix composed the potential coefficients as a lower block. The model coefficients may be determined directly using Lagrange multipliers. In such embodiments, the model coefficients may be solutions of the equation:

$$\begin{pmatrix} I_n \\ \beta_C \end{pmatrix} = \left( I_{n+m} - \hat{\Gamma} G^T (G \hat{\Gamma} G^T)^{-1} G \right) \begin{pmatrix} I_n \\ \beta_{UC} \end{pmatrix}$$

where $B_C$ is a matrix of the model coefficients; I is the identity matrix; n is the number of independent variables; m is the number of dependent variables; $\Gamma$ is a diagonal matrix with positive or zero entries; G is the constraint matrix; $^T$ denotes a matrix transpose; and $B_{UC}$ is a matrix of coefficients of an unconstrained linear model of the received data. Alternatively, the model coefficients may be determined using a numerical optimizer.

The at least one physical property may include a mass balance. The at least one physical property also may include an energy balance. The at least one physical property also may include a gain constraint for a process control system.

Some embodiments may also further include receiving at least one almost-linear constraint equation. Then the embodiments determine an unconstrained algebraic model of the received data and using the unconstrainted algebraic model, identifying at least one of the independent and dependent variables to fix. These embodiments also include creating, using the at least one almost-linear constraint equation and the fixed variables, at least one linear constraint equation. The at least one almost-linear constraint equation may be an energy constraint and/or an atom balance constraint.

An additional embodiment provides an implemented method for generating an improved predictive model of a process system. As a first step, a processor receives data representing the process system in an industrial plant that includes independent variables and dependent variables. The method continues by building an objective function configured to determine a linear model for the received data. The processor also receives at least one constraint equation, the at least one constraint equation representing at least one physical property of the process system. Next, the linear expressions of the depend variables are substituted into the at least one constraint equation and the coefficients for the independent variables in the substituted at least one constraint equation are derived. The method then constructs a numerical optimization problem whose input consists of the objective function and the derived coefficients for the independent variables equal to zero. The method concludes by generating an algebraic model having sets of model coefficients defining an algebraic relationship between the independent variables and each dependent variable, wherein the model coefficients are solutions of the numerical optimization problem, and the generated model provides improved predictions of behavior of the process system that satisfy the at least one physical property.

In such additional embodiments, the at least one constraint equation may be an atom balance constraint, an energy constraint, and/or a gain constraint.

Another embodiment provides a computer implemented method for generating an improved predictive model of a process system (e.g., chemical process or industrial process). As a first step, a processor receives data representing the process system in an industrial plant that includes independent variables and dependent variables. The method continues by building an objective function configured to determine a linear model for the received data. The processor also receives at least one constraint equation, the at least one constraint equation representing at least one physical property of the process system. Next, the at least one constraint equation is solved for chosen dependent variable. Then, the one chosen dependent variable in the objective function is substituted with the solved at least one constraint equations to create a constrained objective function. After the substitution, the method constructs a numerical optimization problem whose input consists of the constrained objective function. Finally, the method concludes by generating an algebraic model having sets of model coefficients defining a relationship between the independent variables and each dependent variable, wherein the model coefficients are solutions of the numerical optimization problem, and the generated algebraic model provides improved predictions of behavior of the process system that satisfy the at least one physical property. The generated model may be a linear model or a non-linear model.

Such embodiments may further include the step of choosing the dependent variable with the highest variables as the at least one chosen depend variable based upon variance.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1A:
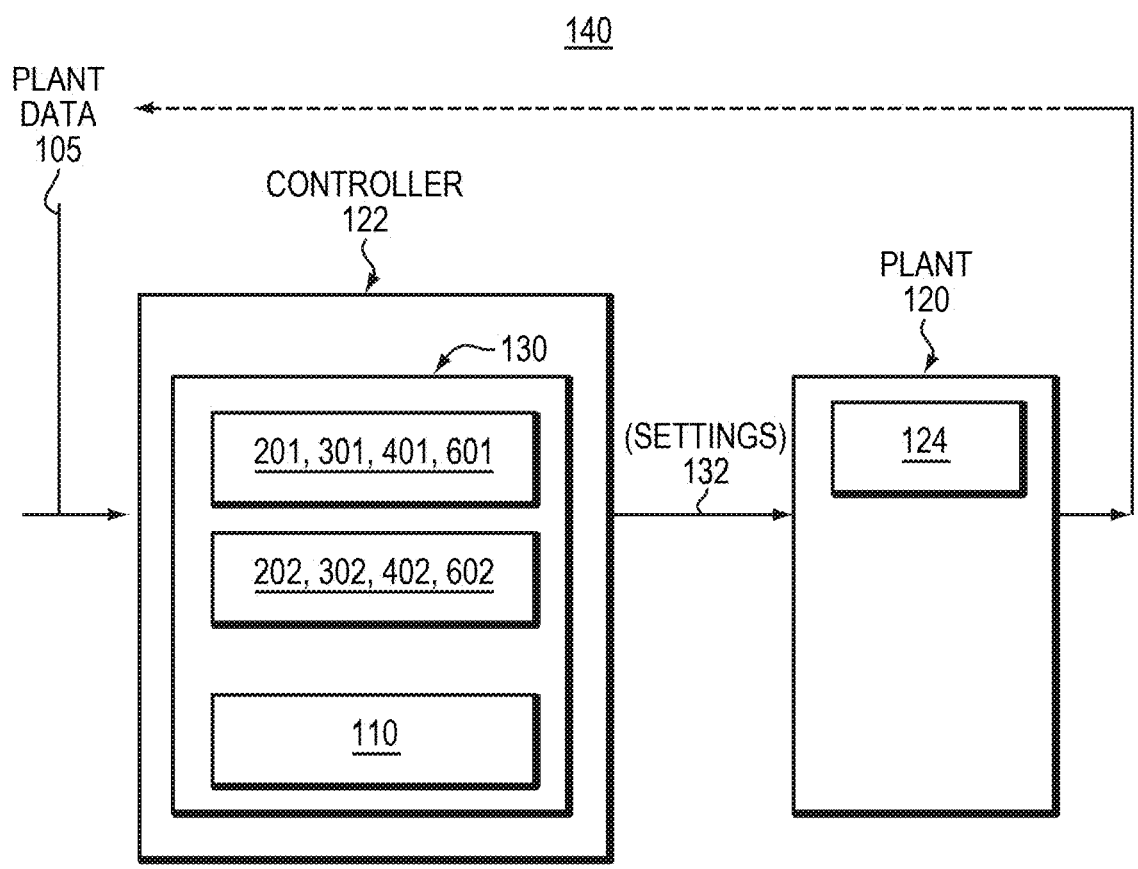
FIG. 1A is a block diagram of a process control (or more generally a process modeling and simulation) method and system embodying the present invention and thus incorporating constraints into an improved model of a chemical/industrial process.

A description of example embodiments follows.

Mathematical models are used to represent subject chemical/industrial processes. These processes can range from an individual reaction (physics-based or chemistry-based) or machinery piece to an entire production unit of an industrial plant. Industrial plants rely on simulations containing these mathematical models for a huge range of vital tasks in real-time or otherwise, online, or offline. For example, a simulation incorporated into an optimizer may use a mathematical model to determine the most efficient manner of operating an individual piece of equipment such as a valve. Alternately, simulations may use mathematical models to determine the best configuration of an entire production unit. Another important application of simulations is their use in controlling the equipment in an industrial plant. They can be applied in every step of process control including long term planning, scheduling and advanced process control. Simulations can actively model current plant conditions and be used for real time applications. Alternatively, simulations can be used to model future conditions and used to determine desired times to perform plant functions or even the design of future plants or modifications to existing plants.

Prior art methods can construct models based purely on first principles, fundamental laws of nature. Simulations that use first principle models have two practical limitations, (i) they can be computationally intensive, up to the point where it becomes prohibitive to include them in real-time operations such as optimization, and (ii) that the first principles sometimes do not describe all physical phenomena causing variance in the modeled chemical process leading to inaccuracies in their predictions.

One way to alleviate the issues associated with first principle models is by creating data driven models that are generated using data from simulations or actual data. These data driven models can then substituted for their corresponding first principle models in simulations. Approaches to incorporate data into process simulation models have included regressing unknown parameters and other parameter estimation strategies such as extended Kalman filtering. These data driven models, or reduced-order models, can be used in place of first principle models while performing calculations much faster. However, optimal simulation models need to satisfy the constraints imposed by the physical properties of the systems they model. Models created solely through data analysis fail to account for these constraints and can produce impossible predictions that violate fundamental properties of nature. To replace a more cumbersome first principle model with a reduced-order model, the replacement model should also respect real life (physics based) constraints such as, but not limited to, mass balance, atom balance, energy balance, and gain constraints.

The following disclosure describes methods for creating models that provide the fidelity to natural laws of a first principle model and the computational speed and flexibility of a reduced order model. The methods further permit the creation of models that incorporate phenomena specific to the subject chemical/industrial process of interest that may not be captured by a more general first-principle model.

Turning to FIG. 1A, illustrated is a process control (or more generally a modeling and simulation) method and system 140 embodying the present invention and the mentioned new methods for incorporating constraints into a model of a chemical/industrial process 124. Briefly, an industrial plant (chemical processing plant, refinery, or the like) 120 performs chemical processes of interest 124. Non-limiting examples include pharmaceuticals production, petroleum refining, polymer processing, and so on. Plant equipment for implementing processes 124 includes distillation columns, various kinds of reactors and reactor tanks, evaporators, pipe systems, valves, heaters, etc. by way of illustration and not limitation. Plant data 105 represents inputs (feed amounts, values of certain variables, etc.) and outputs (products, residuals, physical operating characteristics/conditions, etc.) of the chemical process 124. A controller 122 employs model process control to configure and maintain settings 132 (i.e., parameter values, temperature selection, pressure settings, flow rate, other values of variables representing physical characteristics) operating the plant equipment in carrying out the subject chemical process 124. Controller 122 may also perform longer term planning and scheduling operations for settings 132.

The process control, planning, scheduling, and real-time optimization applications are based on models (of the subject physical, chemical, or engineering process 124) generated by process modeling system 130. Plant 120 may have any number of chemical processes 124, any number of controllers 122, and any number process modeling systems 130 used to configure and maintain their respective settings 132.

In prior art methods, process modeling system 130 may have utilized first principle models. In embodiments of the present invention, the process modeling system 130 generates and deploys models 110 of the subject chemical process 124 generated from received data 201, 301, 401, 601 detailing the physical characteristics and operating conditions of chemical process 124 and incorporating equality constraints 202, 302, 402, 602 representing physical properties and/or limitations of the chemical process 124. Data 201, 301, 401, 601 may be received as part of plant data 105, part of a preexisting dataset, a simulated dataset generated by a first principle model, or any combination of the aforementioned. The models 110 predict, with improved accuracy, the progress and physical characteristics/conditions of the subject chemical process 124. The predictions of models 110 also satisfy the received equality constraints 202, 302, 402, 602. The predictions enable improved performance of the subject chemical process 124 by any of: enabling a process engineer to more effectively troubleshoot the chemical process, enabling debottlenecking of the chemical process, planning and scheduling actions, and optimizing performance of the chemical process at the industrial plant 120. The linear model predictions further include indications of any need to update the settings 132, specific values to quantitatively update the settings 132, and the desired time to update the settings 132. FIGS. 2, 3, 4, 6 and workflows 200, 300, 400, 600 further detail the methods for constructing Applicant's inventive and advantageous models 110 utilized for process modeling, simulation, optimization, and control in system 140.

In a generalized sense, controller 122 is an interface between process modeling system 130 and industrial plant 120. Other interfaces between process modeling system 130 and plant 120 in addition to and/or instead of controller 122 are suitable and in the purview of one skilled in the art given the disclosure herein. For example, there may be an interface between process modeling system 130 and plant 120 systems. There may be a user interface for process modeling system 130. Process modeling system 130 may effectively be part of a simulator or optimizer for non-limiting examples. Various such interfaces enable an end user, e.g., process engineer, to utilize model predictions in (a) monitoring and troubleshooting plant operations and the chemical process of interest 124, in (b) identifying bottlenecks in chemical process 124, in (c) de-bottlenecking the same, and in (d) performing long term planning and scheduling actions, and so forth. In embodiments, an interface enables a process engineer to utilize the model predictions in optimizing (online or offline) the chemical process 124 at the plant 120. In these and other similar ways, embodiments enable various improvements in performance of the chemical process 124 at the subject plant 120.

Process modeling system 130 can also be utilized to design (either entirely or specific modifications to) plant 120. By using models 110 to predict the output of potential designs with hypothetical settings 132, process modeling system 130 can identify what proposed configuration of plant 120 is best suited to a user's needs.

Embodiments of the present invention include several methods able to handle a range of constraint types: a first method 200 (detailed later in FIG. 2) handles multiple linear equality constraints, a second method 400 (detailed later in FIG. 4) is an extension of the first method and can handle almost-linear equality constraints (such as addition of cross products), and general methods 600 (detailed later in FIG. 6) that can potentially handle any type of constraints.

The first method 200 obtains a new linear approximation of the response (dependent) variables by projecting orthogonally a best linear fit given by a linear regression model of choice onto the space spanned by the constraint equations. As a result, the method 200 generates a new regression model within the space spanned by the constraint equations. To keep the predictions of the new regression model as close as possible to the original regression model, the prediction of the new model is selected in the constraint space with the smallest distance to the point corresponding to the prediction of the original model. The orthogonal projection is built to ensure that the independent variables remain constant in the constraint space to keep the predictor variables fixed. Because of the linear nature of the original model and the choice of projection, the new regression model will be also linear. In other words, the desired form of the model's output and predictions is retained.

The second method 400 can handle equality constraint equations that are not linear but rather sums of products of independent and dependent variables. Nonlinear constraint equations of this form appear naturally in e.g. atom balances and energy balances. For instance, if the exact molecular composition of a particle is unknown and one needs to create a model that respects mass balances and atom balances, one could predict the mass of each element and estimate what fraction of mass in the particle corresponds to that atom. In this case, the atom balance equation is nonlinear, but it can be written as the sum of the products of the prediction of the mass of each element times the prediction of the fraction of mass of the atom in that particle. Energy balance constraint equations have similar issues. Applicants present two solutions to handle these type of constraints: a nonlinear but efficient solution and a linear but not as efficient alternative solution. A user can choose the most convenient solution depending on whether the linear nature or efficiency is the greater priority for the model.

In the case of a linear solution, embodiments construct a novel input for a numerical optimization problem. One of the caveats of this method is that, since the constraints are nonlinear, convergence is not necessarily guaranteed. In the case of the nonlinear solution, a variation of the projection from the first method is used to obtain a closed form solution, which is a quotient of polynomials. In such a nonlinear solution, the desired form of the output is not necessarily retained but a solution is obtained of similar form that is easy to interpret. In this case, the use of numerical optimizers is not required and, therefore, a solution (convergence) is always obtained. The only potential issue could be the vanishing of the denominator. However this issue can be controlled for by avoiding redundant or inconsistent constraints.

Additional methods 600 can handle general nonlinear constraints by using a different projection onto the constraint space and numerical optimization. They can also be used to handle situations like the atom balance and energy balance described above and the linear constraints as well. However, since numerical optimization is needed, convergence cannot be guaranteed for nonlinear constraints.

Regardless of whether the constraints are linear or nonlinear, since Applicant's embodiments (the proposed methods 200, 400, 600) include projecting the entire prediction space onto the constraint space, the constraint equations will always be satisfied, even for unseen data and future data not used to generate the models.

First Method 200: Linear Equality Constraints

This method (embodiment) 200 is a combination of the solution of two linear problems: linear regression and data reconciliation. Data reconciliation is a popular technique used to fix errors in measurement in industrial processes. Data reconciliation can only handle linear equality constraints such as mass balance, atom balance, and energy balance, provided molecular composition is known and enthalpies are predicted. Data reconciliation seeks to find the closest point to the measurement in question that satisfies the constraints. That is, data reconciliation finds the orthogonal projection of each point to a constraint space. The constraint space is the manifold defined by the constraint equations. In other words, every point within the constraint space is a solution to the constraint equations. This method 200 applies the same underlying concept of data reconciliation but instead of restricting the projection to individual measurements (or predictions), the entire prediction space composed of all solutions to a linear regression model, is projected.

Mathematically, data reconciliation finds the point in the constraint space where the weighted sum of squares of the difference between the coordinates of the measurement and a point in the constraint space achieves its minimum. The analytical solution of this optimization problem is well known in the art but can also be derived using for instance, Lagrange multipliers. In such a derivation, the constrained measurement is the product of the original measurement and a matrix that depends on the linear equations that define the constraints (such mass balances) and the weights of the sum. Thus, assuming the weights of the sum don't change for a set of measurements, the map used to obtain the constrained measurements from the original measurements is always the same.

Returning to the projection of the entire prediction space as applied by the first method of the invention, the unconstrained prediction space of a linear model is obtained by applying a linear transformation to the predictor (independent) and response (dependent) variables of a dataset. A coefficient matrix can be constructed, defining a linear map for a linear regression model, that is composed of the variable coefficients of the linear regression model. Furthermore, both the constraint equations and weights of the sum of squares of the errors are constant (fixed) across all predictions of the linear regression model. That is, all predictions need to satisfy the same constraints, and the weights are given by constant coefficients of the linear regression. To obtain a new linear space of solutions within the constraint space, the coefficient matrix of the linear regression model is multiplied by a reconciliation matrix derived from the constraint equations.

Some linear equality constraints such as mass balance not only involve response variables but also predictor variables. In traditional data reconciliation, the values of any variable of a measurement to be projected are allowed to be adjusted independently for a projected measurement that meets the constraints to be determined. Since mass balance and other physical equality constraints, hold for the specific given input values, not an approximation of them, applying data reconciliation to predictions for systems, such as chemical processes or systems, will not give the desired solution. The methods and embodiments described herein, solve this issue and determine mathematically the best linear approximation for a dataset that always satisfies a set of provided linear constraint equations.

A key capability of the present invention is the ability to reduce the number of constraints and encode all the information in such a way that the predictions of any data point (seen or unseen) satisfy the constraint equations. Since the constraints are linear equations, they can be expressed as the product of a constraint matrix and an ordered vector of independent and dependent variables. Each row of the constraint matrix represents a constraint (a mass balance equation, an atom balance equation, or an energy balance equation if they are linear) and each entry is the coefficient of a variable in the corresponding equation. The vector of independent and dependent variables can also be written as a matrix multiplication since the response (dependent) variables are linear with respect to the predictors (independent) variables. In this case, the product of above matrix consists of an extended coefficient vertical block matrix (whose blocks are the identity matrix, corresponding to the predictor variables, and a coefficient matrix, corresponding to the response variables), and a matrix of predictor (independent) variables only. To ensure the predictions/output of any given independent variables satisfy the constraint equations, the product of the constraint matrix and the extended coefficient matrix need to be zero. Thus, the constraints are independent of the inputted predictor (independent) variables and guaranteed to be satisfied even for unseen data. The new constraints are also linear with respect to the coefficients. Moreover, the number of coefficients has been substantially reduced. The number of coefficients is the number of constraint equations (i.e. number of mass balances) times the number of independent variables.

A detailed mathematical foundation for an example embodiment of the first method 200 to impose linear equality constraints such as mass balance in a linear regression model is as follows. Suppose a regression model created from a dataset composed of n independent variables (x) and m dependent variables (y) needs to satisfy near equality constraints such as $a_1^k x_1 + \ldots + a_n^k x_n + b_1^k y_i + \ldots + b_m^k y_m = 0$ for $1 \leq k \leq l$. As used throughout, the superscripts denote the data point, and the subscripts denote independent variable features and dependent variable features. Since the equality constraint equations are linear they can be written in matrix notation as:

$$G \begin{pmatrix} x_1 \\ \vdots \\ x_n \\ y_1 \\ \vdots \\ y_m \end{pmatrix} = \begin{pmatrix} a_1^1 & \ldots & a_n^1 & b_1^1 & \ldots & b_m^1 \\ \vdots & \ldots & \vdots & \vdots & \ldots & \vdots \\ a_1^l & \ldots & a_n^l & b_1^l & \ldots & b_m^l \end{pmatrix} \begin{pmatrix} x_1 \\ \vdots \\ x_n \\ y_1 \\ \vdots \\ y_m \end{pmatrix} = \begin{pmatrix} 0 \\ \vdots \\ 0 \end{pmatrix}$$

where G is an l×(n+m) matrix where each row represents a constraint equation and each column the coefficients (a and b) of each variable in the different constraint equations.

The goal is to find $\hat{Y}$ such that $\hat{y}_k = \beta_0^k + \beta_1^k x_1 + \ldots + \beta_n^k x_n$ for $k = 1, \ldots m$, such that $\hat{y}_k^j$ is close to the data point $y_k^j$, for $j = 1, \ldots n$ and satisfies the constraint equations l. This can also be written in matrix notation. Let $\beta$ denote a (m×n) matrix containing the coefficients of a linear regression of the data, then $\hat{Y} = \beta X$. For the predictions of the linear regression model to always satisfy the equality constraint equations defined in matrix G, the following equation must hold:

$$G \begin{pmatrix} X \\ \hat{Y} \end{pmatrix} = G \begin{pmatrix} X \\ \beta X \end{pmatrix} = G \begin{pmatrix} I_n \\ \beta \end{pmatrix} X = 0.$$

Where $I_n$ is a (n × n) size identity matrix. Since the aforementioned merged constraint equation containing linear constraint information should remain true for any values of x and/or X, the equation can be simplified to the product of the first two matrices to be zero.

$$G \begin{pmatrix} I_n \\ \beta \end{pmatrix} = 0.$$

More generally the linear constraint equations can be interpreted as follows. One can substitute the dependent variables in the constraint equations by their expressions as a linear function of the independent variables. The resulting equations can be merged using the independent variables as common factors. In the resulting merged equation, the constraint equations are met for any choice of independent variables if the coefficients of each independent variable for each constraint equation are zero. These coefficients in the merged equations are linear combinations of the coefficients of the data's linear regression.

A linear regression can be found that best fits the data while also making the coefficients of the merged constraint equations zero. The next part of this method 200 is to find the solution of the optimization problem in the case where the loss function is differentiable. For instance, in Ordinary Least Squares, the loss function is simply the least squares which is differentiable. The solution for the linear regression model that is constrained by the linear constraint equations is derived by multiplying the coefficients of an unconstrained solution of the linear regression by the data reconciliation matrix, where the weights of the sum of the coordinates corresponding to the input variables are set to zero. This solution can be derived either by a numerical optimizer or analytically using Lagrange multipliers.

A constraint optimization problem can be defined to determine linear regression Y. The optimization problem can be solved through numerical optimization or direct derivation. The following derivation will utilize Ordinary Least Squares (OLS) and ridge regression (RR) models since both model functions are differentiable but any linear regression model such as a partial least squares (PLS), LASSO, or the elastic net. Let:

$f_{OLS}(\beta)=(Y-\hat{Y})^T \Gamma^{-1}(Y-\hat{Y})$, be the objective function for multivariable OLS, $f_{RR}(\beta)=(Y-\hat{Y})^T \Gamma^{-1}(Y-\hat{Y})+\alpha \beta^T \Gamma^{-1}\beta$, be the objective function for multivariate RR, and $\Gamma=\text{diag}(\gamma_i, \ldots, \gamma_m)$ is a positive definite diagonal matrix. Traditionally, $\gamma_i$ is chosen to be the variance of $\gamma_i$. Then, the solution of the following constraint optimization problem:

$$\min_{\beta} f(\beta), \text{ such that } G\begin{pmatrix} I_n \\ \beta \end{pmatrix} = 0,$$

for $f=f_{OLS}$ or $f=f_{RR}$ is the matrix $\beta_C$ which is a (m×n) matrix containing the coefficients of a linear regression that satisfies the constraints and is given by $$\begin{pmatrix} I_n \\ \beta_C \end{pmatrix} = \left(I_{n+m} - \hat{\Gamma} G^T (G \hat{\Gamma} G^T)^{-1} G\right)\begin{pmatrix} I_n \\ \beta_{UC} \end{pmatrix}$$

where $\beta_{UC}$ is a (m×n) matrix containing the coefficients of a linear regression fit to the data independent of the constraints, and $\hat{\Gamma}$ is a (m+n)×(m+n) diagonal matrix where the top n-diagonal elements are equal to 0 and the bottom m-diagonal elements are the same as the ones in $\Gamma$. The solution for $\beta_{UC}$ can be derived by any desired linear regression modeling technique such as but not limited to OLS, RR, PLS, or LASSO. Then, values of $\beta_C$ and therefore linear regression model $\hat{Y}$ that always provide outputs/predictions that satisfy all l constraint equations can be calculated. Importantly, this remains true even for unknown data points that were not included in the dataset used to derive $\beta_{UC}$ or $\beta_C$.

Figure 1B:
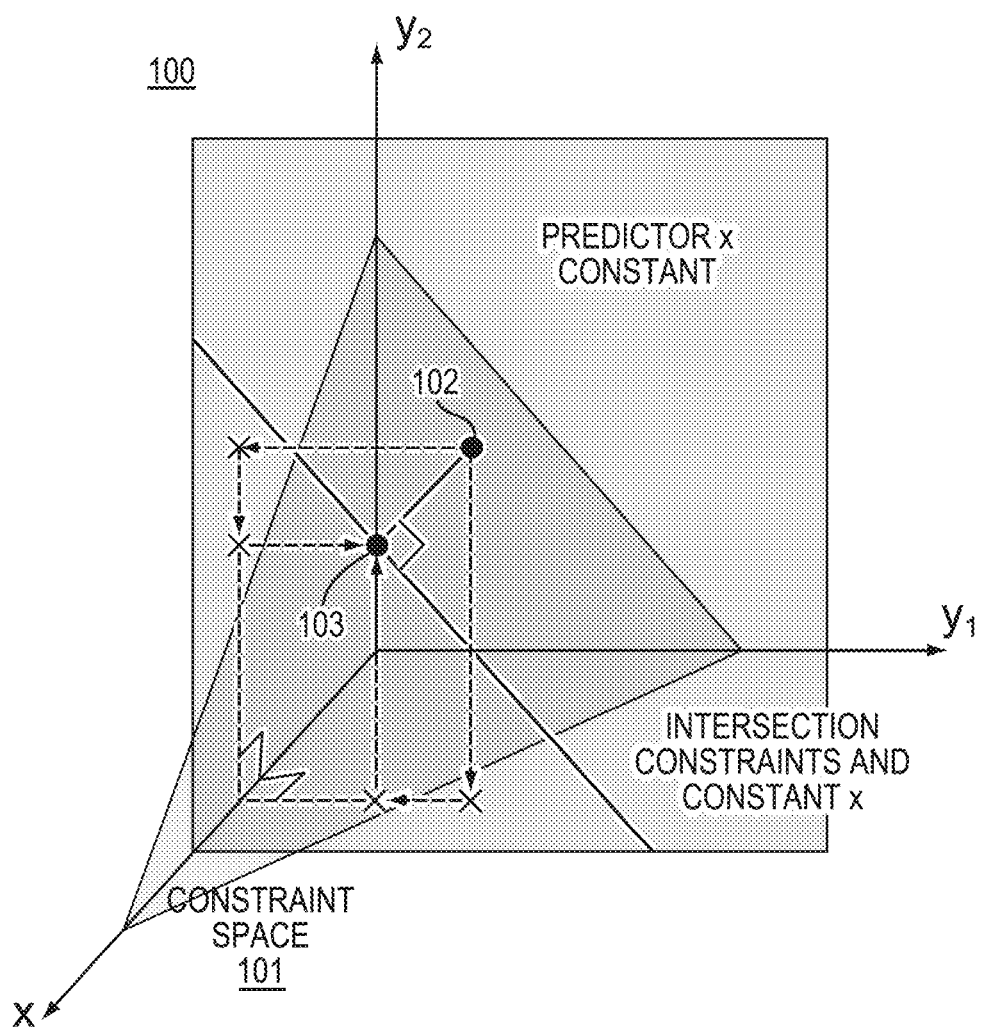
FIG. 1B is a graph of an Ordinary Least Squares regression with one independent variable x and two dependent variables $y_1$, $y_2$ projected onto a constraint space in embodiments.

Intuitively, Applicant's method 200 is using the projection of the linear regression problem without constraints but choosing a different optimal point. In this case there is a third orthogonal projection taking place, the one onto the intersection of constraint space and the space spanned by the predictor variables, which ensures that the constraints are met with the original set of inputs. FIG. 1 is illustrative.

FIG. 1 shows an Ordinary Least Squares regression with one independent variable x and two dependent variables $y_1$, $y_2$ projected onto a constraint space. Space 100 has three dimensions x, $y_1$, and $y_2$. Constraint space 101 is a subspace of Space 100 defined by a linear constraint equation of $ax+by_1+cy_2=0$. Point 102 from an unconstrained OLS regression model exists in space 100 but not in constraint space 101. Point 103 is a projection of point 102 onto constraint space 101. Projected point 103 preserves the value of the predictor variable x as the orthogonal projection of point 102 ensures that the x value remains constant. Therefore, the nature of OLS is preserved during the projection. Every point in the unconstrained OLS regression model can be similarly projected. This method allows for the projection of the entire OLS regression model to be projected onto the constraint space 101 including unknown and future data points not used to generate the original regression model.

Figure 2:
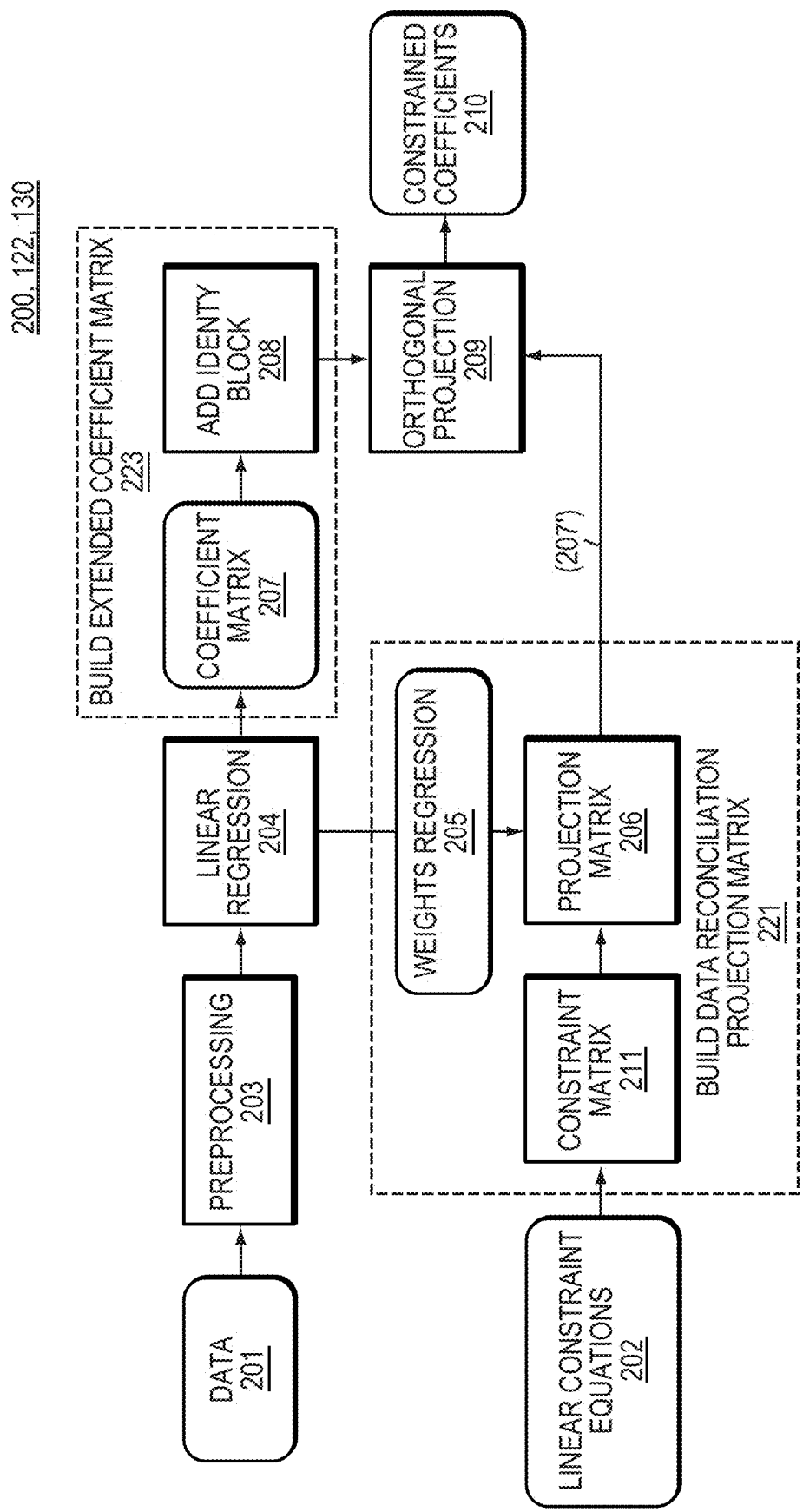
FIG. 2 is a workflow diagram of the orthogonal projection used to obtain constrained coefficients for a linear regression model that incorporates linear equality constraint equations in embodiments.

As mentioned before, this method 200 is very efficient and may be performed using any available package such as but not limited to NumpPy, SciPy, TensorFlow and PyTorch, or in the Python base language to compute the best fit solution, compute the data reconciliation matrix, and multiply the extended coefficient matrix and data reconciliation matrix. Additionally, all methods of the invention can be equivalently produced in any programming language capable of performing numeric operations, such as but not limited to, FORTRAN, C, C++, Julia, R, MATLAB, and Octave. FIG. 2 is a flow diagram of one embodiment such as found in process modeling system 130 and controller systems 122, for non-limiting example.

FIG. 2 is a workflow 200 of the orthogonal projection used to obtain constrained coefficients 210 for a linear regression model 204 that incorporates linear constraint equations 202. Process modeling system 130 or controller system 122 receives data 201 about an industrial system, reaction, or process of interest (such as chemical process 124 for non-limiting example). Data 201 includes independent and dependent variables. Data 201 serves as the basis for a linear regression model 204 that quantifies the linear relationship between the data's variables. Data 201 is preprocessed 203 and used to generate a linear regression model 204. Process modeling system 130 or controller system 122 creates the linear regression model 204 using any known techniques including but not limited to Ordinary Least Squares (OLS) and Ridge Regression (RR).

Process modeling system 130 or controller system 122 also receives linear constraint equations 202. The linear constraint equations may be imposed by the physical properties of the system/reaction/process of interest, for example, mass balance equations. Using the linear constraint equations 202 and the linear regression model 204, step or module 221 constructs a data reconciliation projection matrix 206 as follows. The reconciliation projection matrix is equivalent to reconciling predictions in data reconciliation except the weights associated with the independent variables are set to 0 to ensure compliance for all potential inputs.

First, builder module 221 constructs a constraint matrix (G) 211 from the coefficients of the linear constraint equations 202. Then, using the weights 205 of the linear regression of 204, builder module 221 uses the constraint matrix (G) 211 to construct the projection matrix 206: $(I_{(n+m)} - \hat{\Gamma}G^T(G\hat{\Gamma}G^T)^{-1}G)$ described mathamatically above.

Next, step or module 223 uses linear regression model 204 to create the coefficient matrix ($\beta_{UC}$) 207. Recall from the mathematical foundation discussed above, coefficient matrix ($\beta_{UC}$) 207 is a matrix that contains the coefficients of linear regression model 204 independent of the constraint equations 202. Continuing with method 200, step/module 223 extends the coefficient matrix by adding an identity matrix 208 on top of the coefficient matrix 207 to create a block matrix (referred to as the extended coefficient matrix 207'). Finally, orthogonal projection 209 is achieved by process modeling system 130 or controller system 122 multiplying the extended coefficient matrix 207' (output from step/module 223) and the data reconciliation projection matrix 206 (output from builder module 221). A block matrix results from the product of the two matrices 207' and 206. The bottom block of that resulting block matrix contains the constrained coefficients ($\beta_C$) 210 of the linear regression model 204 for data 201 that also satisfy the constraint equations 202.

Alternatively, a numerical optimizer can be used to determine the best constrained coefficients $\beta_C$. However, this alternative is not as efficient as directly calculating the constrained linear regression model through matrix multiplication as detailed above with respect to FIG. 2. The method 200 described herein can also be used with any linear regression not only the ones with differentiable loss functions much faster than any traditional numerical optimization approach even if the results obtained will not represent the explicit optimum described above.

Second Method 400: Almost-Linear Equality Constraints

The first method 200 described above can be extended to nonlinear equality constraint equations of the form of sums of products of independent and dependent variables. One possible adaption is to obtain a solution using a numerical optimizer. One can't directly incorporate the constraints into a numerical optimizer since the system becomes overdetermined. Therefore, the number of degrees of freedom must be reduced. This can be done in the same way as described in the first method 200: for dependent variables in the constraint equations, substitute linear expressions of independent (predictor) variables in the constraint equations and group by independent variables (and their cross products). The new substituted and grouped constraint equations may not be linear, but the coefficients of the predictor variables in the resulting constraint equations are representative of the new constraints. A solution may be obtained by using a nonlinear numerical optimizer with a loss function of choice and the new constraint equations. In this case, because of the substitution and degree of freedom reduction, the system of equations will, in general, not be overdetermined. However, since the resulting constraint equations are nonlinear, the optimization might no longer be a convex problem and therefore one cannot guarantee convergence. A key ability of the second method (embodiment) 400 is setting up the optimizer to identify a convergence and therefore a solution. With such convergence, an improved level of modeling the chemical process 124 of interest guarantees that the constraints are exactly met for seen and unseen data.

A detailed mathematical description of an example generalization of the process in the first method 200 to include almost-linear equality constraints, such as atom balance constraints, for non-limiting example, is as follows. In this case, the constraint equations are sums of products of dependent variables and independent variables. The data with n independent variables x and m dependent variables y satisfy 1 almost linear equality constraints such as:

$$\sum_{i=1}^{n} a_i^k x_i + \sum_{i=1}^{m} b_i^k y_i + \sum_{i=1}^{n}\sum_{j=1}^{n} c_{i,j}^k x_i x_j + \sum_{i=1}^{n}\sum_{j=1}^{m} d_{i,j}^k x_i y_j + \sum_{i=1}^{m}\sum_{j=1}^{m} e_{i,j}^k y_i y_j = 0,$$

for $1 \leq k \leq l$

Let $\hat{Y} = \beta X$ denote a linear regression model for the dataset. Substituting each dependent variable $y_j$ of the constraint equation with $\hat{y}_j$ that can be expressed as a linear function of independent variables x creates the following derivation:

$$\sum_{i=1}^{n} a_i^k x_i + \sum_{i=1}^{m} b_i^k \hat{y}_i + \sum_{i=1}^{n}\sum_{j=1}^{n} c_{i,j}^k x_i x_j + \sum_{i=1}^{n}\sum_{j=1}^{m} d_{i,j}^k x_i \hat{y}_j + \sum_{i=1}^{n}\sum_{j=1}^{n} e_{i,j}^k \hat{y}_i \hat{y}_j =$$

$$\sum_{i=1}^{n} \left( a_i^k + \sum_{j=1}^{m} b_j^k \beta_i^j \right) x_i + \sum_{i=1}^{n}\sum_{j=1}^{n} \left( c_{i,j}^k + \sum_{t=1}^{m} \beta_j^t d_{i,t}^k + \sum_{r=1}^{m}\sum_{t=1}^{m} e_{r,t}^k \beta_j^t \beta_i^r \right) x_i x_j = 0$$

for $1 \leq k \leq l$. Using the above derivation and an objective function of choice (such as $f_{OLS}$ or $f_{RR}$ as defined above in the first method 200), a numerical optimization problem can be created. Since the constraint equations must be satisfied for any value of the independent variables, new general constraint equations are obtained by setting the coefficients of the independent variables in these new constraint equations to zero.

$$a_i^k + \sum_{j=1}^{m} b_j^k \beta_k^j = 0, \quad c_{i,j}^k + \sum_{t=1}^{m} \beta_j^t d_{i,t}^k + \sum_{r=1}^{m}\sum_{t=1}^{m} e_{r,t}^k \beta_j^t \beta_i^r = 0$$

for i, j=1, n and k=1, . . . , l. These general constraint equations along with a chosen regression objective function provide the inputs for a numerical optimizer used to determine a coefficient matrix $\beta$ that will create a linear regression model that always satisfies the constraint equations. The general constraint equations also provide the variable reduction necessary to increase the likelihood of convergence of the numerical optimizer.

Figure 3:
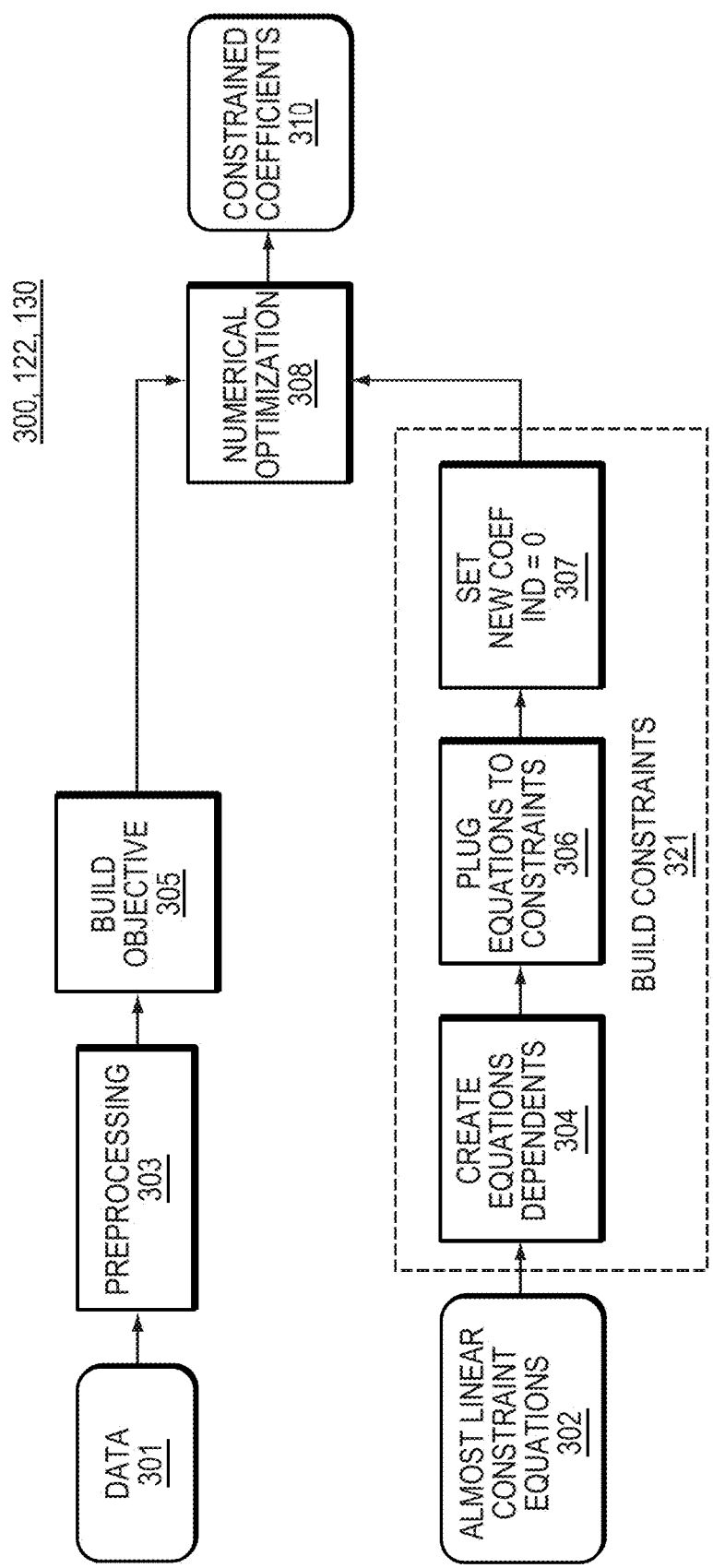
FIG. 3 is a workflow diagram of a numerical optimizer used to obtain a linear regression model that incorporates almost linear equality constraints in embodiments.

FIG. 3 shows the method workflow 300 for numerical optimization used to obtain a model that incorporates almost linear constraints (the model supporting process modeling system 130 or controller system 122 in embodiments). To begin, the method 300 or corresponding implementing system 130, 122 receives data 301 and almost linear constraint equations 302. Preprocessor 303 preprocesses data 301 using any desired preprocessing methods. Step 305 builds an objective function for data 301 with an objective to create a best fitting linear regression model. The resulting objective function can be any objective function such as the ordinary least squares or ridge regression objective functions.

Builder module/step 321 uses the almost linear constraint equations 302 to build constraints that will be used, in combination with objective function from step 305, as the inputs for numerical optimization 308. Builder module/step 321 uses the received almost linear constraint equations 302 to derive more general constraints to reduce the number of variables inputted into the numerical optimization 308 and increase the likelihood of convergence. First builder module 321 creates equations 304 for the dependent variables in the received almost linear constraint equations 302. The created equations 304 are linear expressions of the independent variables. Next builder module 321 plugs the created dependent variable equations 304 into the original received constraint equations 302 in a substituting manner to create updated constraint equations 306 expressed only using the independent variables. The new independent variables coefficients in the updated constraint equations 306 can be isolated. Because the original received constraint equations 302 must be satisfied for all independent variable values, builder module 321 creates new general constraints 307 by isolating and setting the new coefficients for the independent variables in the updated constraint equations 306 to zero. These generalized constraints 307 are input into numerical optimization 308 along with objective function 305. In turn, the numerical optimization 308 produces the coefficients for a constrained model that satisfies the almost linear constraint equations 302.

In addition to the numerical optimizer workflow 300, a projection approach, similar to the first method 200, can also be used to obtain a solution with almost linear constraint equations. The primary benefit of this approach is that a closed form solution can always be found. In this method 400, for each fixed data point, one can reconcile a nonlinear equation by allowing only a few variables to change and fixing the other variables. Therefore, the approach fixes as many variables as needed to create a linear equality constraint and then uses the same mathematical algorithms and process as described above in method 200 for linear equality constraints. Fixing the same variables for the entire dataset (for instance the ones with better performance) allows embodiments to create a new set of predictions that satisfies nonlinear equality constraints.

For instance, assume mass balance and atom balance need to be respected in a linear regression model. Assume the molecular composition of each element is not known but the mass of each element and the content of the atom in each element are predicted by the model. As mentioned before, the atom balance is expressed as nonlinear constraint equations comprising the sum of the product of the mass of each element times the atom content. The atom content can be fixed to the values predicted by the original model. The only variables that can be modified to satisfy the balances are the mass of each element. Therefore, in the constraint matrix, only two types of rows need to be created: one row for mass balance and one row for each atom to be balanced. The row corresponding to the mass balance is constructed as explained above in the method 200 for linear constraint equations. Each atom balance will give a row where each entry is the atom content of the corresponding element.

A detailed mathematical explanation for an example embodiment of this approach is as follows. In this method/ embodiment 400, one can choose a subset of the dependent variables to be fixed and vary the others. This method 400 will be illustrated with a simple example. Suppose the data satisfy the following constraint equations:

$$x_1+y_1+y_2=0 \text{ and } x_1x_2+y_1y_3+y_2y_4=0.$$

Either $y_1$ and $y_2$ or $y_3$ and $y_4$ can be fixed to create linear constraint equations. Suppose $y_3$ and $y_4$ are fixed since the performance of a unconstrainted linear regression was higher for $y_1$ and $y_2$. Then the constraint equations can be written in matrix notation as:

$$\begin{pmatrix} 1 & 0 & 1 & 1 \\ x_2 & 0 & \hat{y}_3 & \hat{y}_4 \end{pmatrix} \begin{pmatrix} x_1 \\ x_2 \\ \hat{y}_1 \\ \hat{y}_2 \end{pmatrix}$$

For each data point, this is now a linear problem and the optimal solution can be derived using the first method 200 for linear equality constraints. Specifically, one applies a different data reconciliation matrix for each data point to obtain a prediction that satisfies the constraints. As in the first method 200, a linear relationship between the independent and dependent variables can be defined as $\hat{Y}=\beta X$. Using this relationship, the dependent variables in the constraint matrix can be substituted with a linear expression of independent variables to obtain:

$$G = \begin{pmatrix} 1 & 0 & 1 & 1 \\ x_2 & 0 & \beta_0^3 + \beta_1^3 x_1 + \beta_2^3 x_2 & \beta_0^4 + \beta_1^4 x_1 + \beta_2^4 x_2 \end{pmatrix}$$

Using this substitution, a symbolic data reconciliation matrix can be computed and used, as described in the first method 200, to obtain new equations for $y_1$ and $y_2$ that always satisfy the constraints. The nonlinearity of the approach appears in the constraint matrix since the expression of independent variables is different for every data point. In practice, one can work symbolically to obtain a unique constraint and reconciliation matrix.

Figure 4:
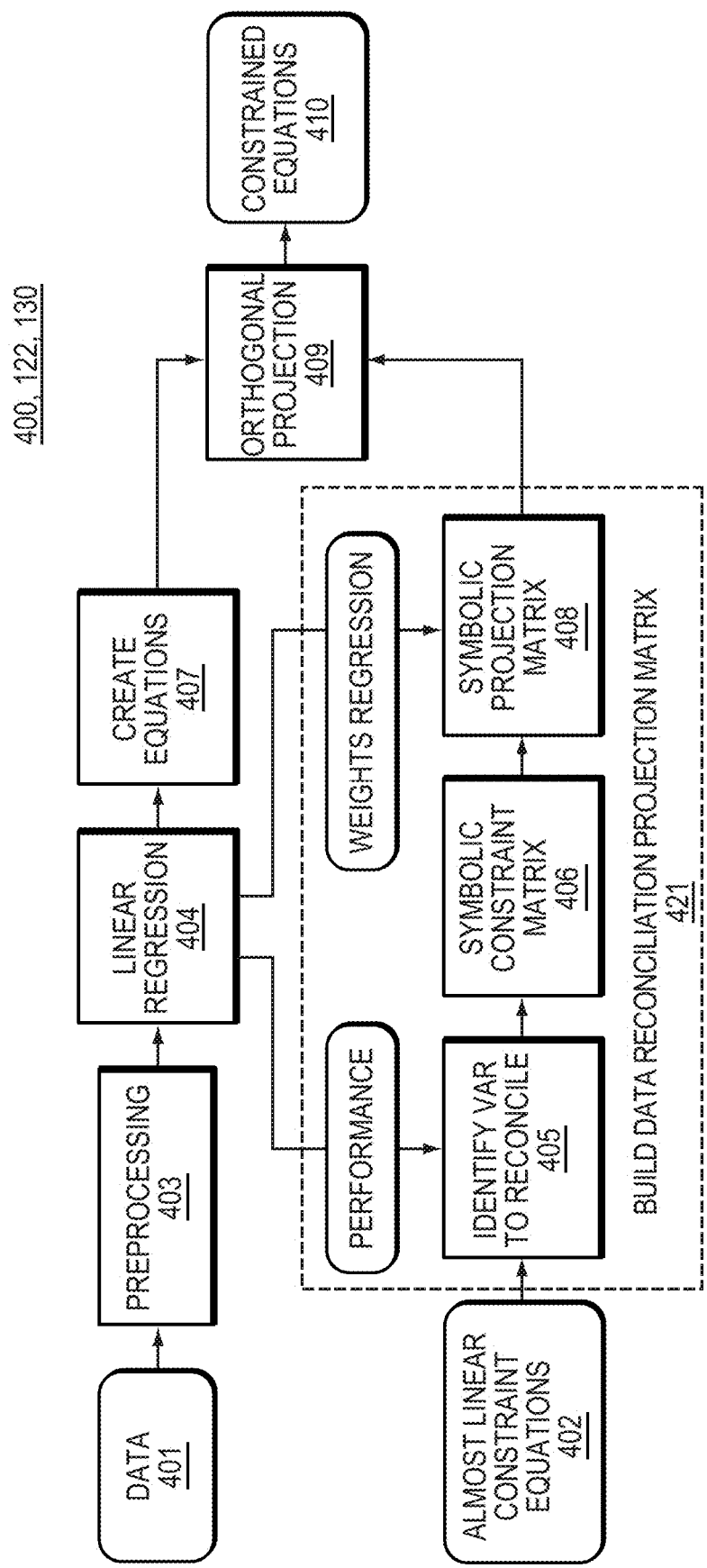
FIG. 4 is a workflow diagram of a nonlinear orthogonal projection used to obtain constrained coefficients for a linear regression model that incorporates almost linear constraint equations in embodiments.

FIG. 4 is a workflow of method 400 for nonlinear orthogonal projection used to obtain constrained equations for a linear regression model that incorporates almost linear equality constraint equations. An implementing process modeling system 130 or controller system 122 receives data 401 and almost linear constraint equations 402. Module 403 preprocesses Data 401 using any desired method or technique (common or known in the art). A linear regression module 404 performs a linear regression on data 401. Using the resulting linear regression output from module 404, module or step 407 creates symbolic linear equations of the independent and dependent variables. Next, step or module 409 performs an orthogonal projection by multiplying a reconciliation matrix by a vector containing the symbolic linear equations output from module 407. The matrix multiplication produces linear equations constrained for some of the variables by the almost linear constraint equations 402.

Method/system 400 constructs a data reconciliation projection matrix 421 in a similar manner to the data reconciliation projection matrix 221 in workflow 200 for linear constraint equations. However, before constructing the matrix 421, method/system 400 makes almost linear constraint equations 402 appear to be linear. Using the performance of the variables in the linear regression output from module 404, step 405 identifies variables to be reconciled and to be treated as fixed in order to create a linear equality constraint. Step/module 406 constructs a symbolic constraint matrix that, for each data point, expresses the almost linear constraint equations 402 as linear equations. Using the weights from the linear regression performed by module 404, step 408 constructs a symbolic projection matrix by substituting linear expressions of independent variables for the dependent variables in the constraint matrix constructed by step 406.

Thus, the closed form solution can be obtained by multiplying the resulting symbolic reconciliation projection matrix 421 by a vector containing the symbolic linear expressions output from module 407 of the independent and dependent variables. A key advantage of this method/embodiment 400 is that a closed form solution is always obtained.

Third Method 600: General Nonlinear Equality Constraints

Another projection method (embodiment) 600 can be used to impose equality constraints for both linear, like mass balance, and nonlinear like potentially atom balance. Instead of using the orthogonal projection, one can use component projections to guarantee that constraints are met. If constraint equations are solved for some of the dependent variables, an unconstrained model can be trained, using numerical optimization, where the value of some of the dependent variables are replaced by the solution of the equality constraints.

Figure 5:
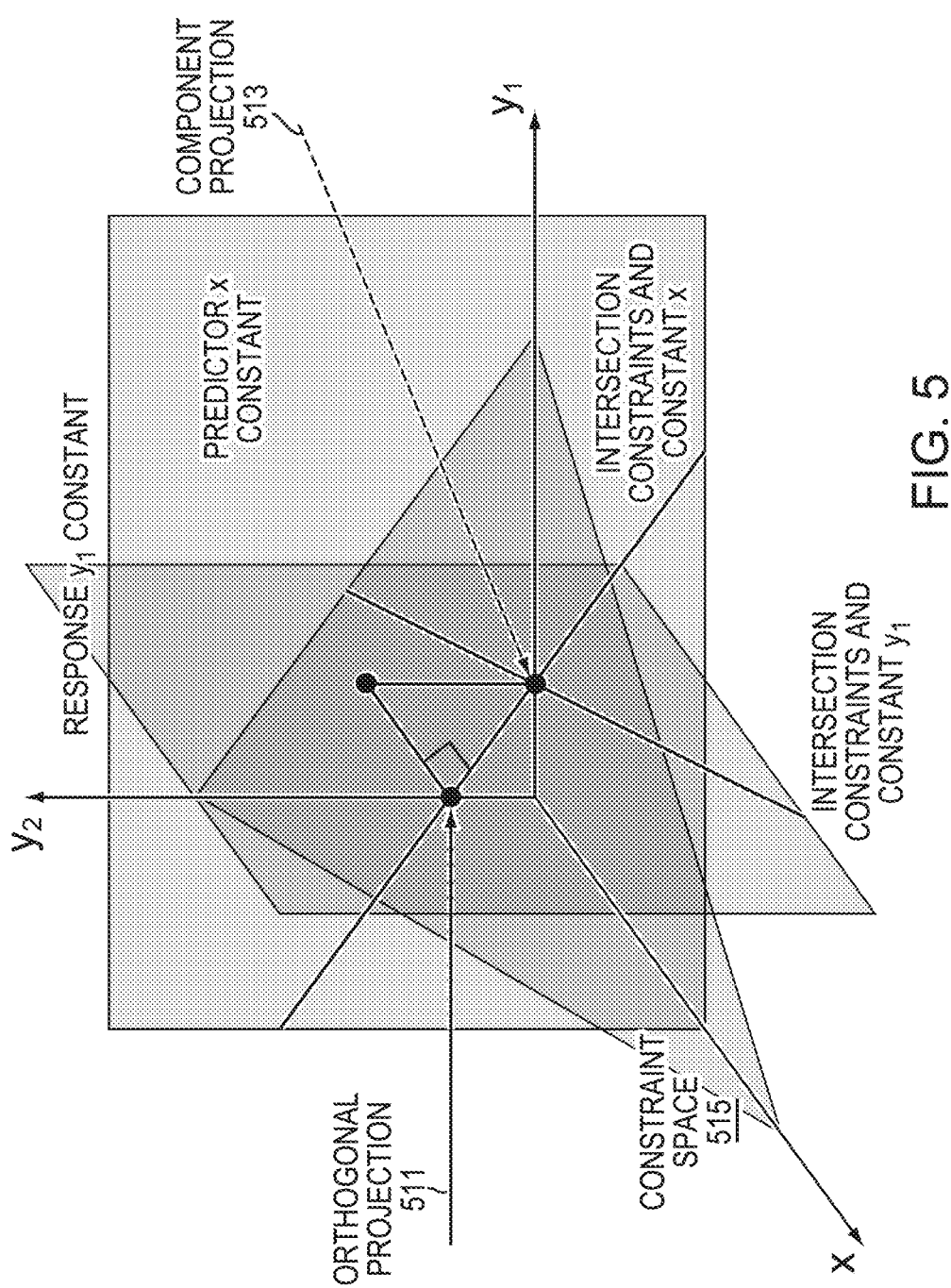
FIG. 5 is a graph of a component projection technique where the model is trained for $y_1$ and once its value is found, a component projection is performed along the direction of $y_2$ to the constraint space.

FIG. 5 shows an orthogonal projection 511 and a component projection 513. In this method the model is trained for $y_1$ and once its value is found, a component projection 513 is performed along the direction of $y_2$ to the constraint space 515. FIG. 5 is an illustration of a component projection in comparison to an orthogonal projection and is not intended to reflect the specific use of component projections in method 600. Method 600 consists of first reducing the space of solutions via a component projection using the constraint equations, and finding the best fit via numerical optimization in the reduced space.

A more detailed mathematical background for an example embodiment of the third method 600, component projection, is as follows. If the data satisfies the following equality constraints:

$$\phi(X, Y) = (\phi_1(X, Y), \ldots, \phi_l(X, Y)) = 0,$$

where $\phi$ is a continuously differentiable function and $Y''=\{y_{k_1}, \ldots, y_{k_l}\}$ and $Y'=Y/Y''$. If the Jacobian of $\phi$ with respect to $Y''$ doesn't vanish at a given point $(X, Y')$ then, by the implicit function theorem, there exist functions:

$$y_{k_i} = \varphi_k(X, Y'),$$

for i=1, . . . , l such that $$\phi(X, Y', \varphi(X, Y'))=0,$$

for all X, Y' in a neighborhood of that point. Therefore, the constraints can be solved for l dependent variables.

For example, the OLS objective function (or similar regression objective functions) can be used to create and solve an optimization problem that includes the equality constraints. A new unconstrainted objective function can be defined as $$f(\beta) = (Y' - \hat{Y}')^T (\Gamma')^{-1} (Y' - \hat{Y}') + (Y'' - \varphi(X, \hat{Y}'))^T (\Gamma'')^{-1} (Y'' - \varphi(X, \hat{Y}')),$$

where $\hat{Y}'=\beta X$ and $\Gamma'$ and $\Gamma''$ denote the error covariance matrix associated with Y' and Y" respectively.

The predictions of Y" can be found by:

$$Y''=\varphi(X, \hat{Y}').$$

This derivation guarantees that the constraints are fully met for all predictions.

Figure 6:
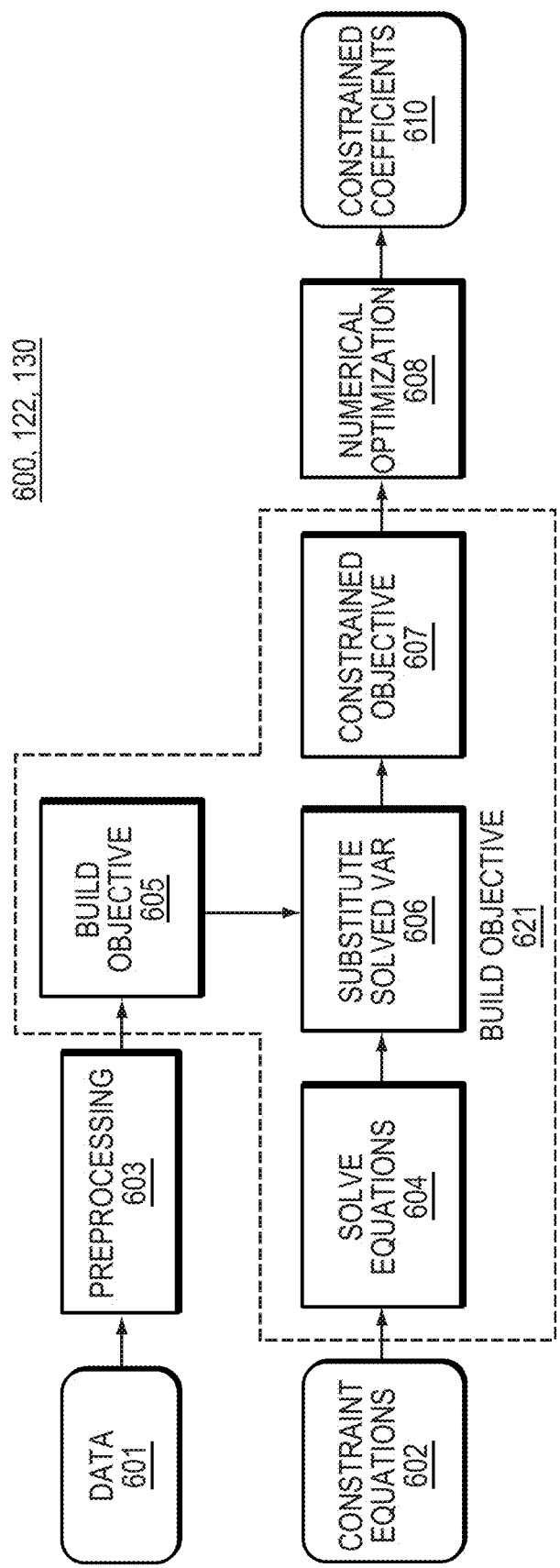
FIG. 6 is a workflow diagram of a component projection used to obtain constrained coefficients for a linear regression model that incorporates general constraint equations in embodiments.

FIG. 6 illustrates the method 600 workflow of a component projection embodiment used to obtain constrained coefficients for a linear regression model that incorporates general constraint equations. Process modeling system 130 or controller system 122 implementing method 600 receives data 601. Preprocessor steep or module 603 subjects the received data 601 to any desired preprocessing methods or techniques common or known in the art. Using data 601, step 605 of module 621 creates an objective function 605 that determines an unconstrained linear model fit to Data 601. Process modeling system 130 or controller system 122 also receives Constraint equations 602. Constraint equations 602 are general equality constraints and are not required to be linear or almost linear equations. Step 604 solves constraint equations 602 for some of their dependent variables. In turn, step 606 uses the solved variables of the constraint equations 602 as substitutes into the initial objective function output from step 605. The substitution creates a constrained objective function 607 whose solutions satisfy constraint equations 602. This substitution also creates a component projection 513 similar to the one illustrated by FIG. 5.

After the constrained objective function 607 is derived in module 621, step 608 responsively applies a numerical optimization, such as described above in FIG. 3, to find solutions. The solutions of the constrained objective function 607 provide the constrained coefficients 610 for a linear regression model for data 601 that satisfies the constraint equations 602.

Traditionally, similar numerical optimization techniques are only used for linear equality constraints with a convex twice differentiable optimization function. However, embodiments/method 600 extend the application of such techniques to nonlinear equality constraints as well. In such situations, the convergence of the model cannot be guaranteed as the convexity of the model might be lost. However, most current numerical optimizers are able to find an optimal solution even when the problem is not convex. Thus, a key part of method 600 is to provide the set up for numerical optimization that can handle general nonlinear constraint equations.

Fourth Method: Almost-Linear Equality Constraints Preserving the Linearity of the Model.

This method/embodiment provides an alternative solution that addresses some limitations of the second and third methods 400 and 600 when dealing with both linear and nonlinear equality constraints. These limitations appear when the desired constrained model needs to be linear, but the constraints are not. In chemical engineering, constrained models are often used to optimize products and production plans. As a result, simple models, such as linear or polynomial models, are highly desirable to achieve reliable results faster and with a better accuracy.

Before describing a solution to handle the linear constraints, the potential nonlinearities of second and third methods 400 and 600 should be explored. In the third method 600, the model of the variable used to solve an almost-linear equality constraint will be, in general, a ratio of two polynomials: the numerator will be a second order polynomial and the denominator will be linear. In second method 400, if the workflow of first method 200 is used, the models of the variables that we project onto the constrained space will be ratios of higher order polynomials and nonlinear. However, using the numerical optimization approach 300 described in FIG. 3 a desired linear model form can be obtained. Unfortunately, the number of constraints that second method 400 can create is sometimes larger than the number of unknowns and therefore, there will not be enough degrees of freedom to solve a constrained optimization. For instance, if a model has n independent variables for m dependent variables, the number of unknowns will be (n+1)m. If the model needs to satisfy one almost-linear equality constraint, it yields $$\binom{n+2}{2} = (n+2)(n+1)/2$$

equations. Thus, if $$m < \binom{n+2}{2},$$

the optimizer cannot produce a solution.

A simplification of the third method 600 exists that can significantly speed up the workflow and address convergence issues at the expense of potentially sacrificing performance of one of the variables slightly. If the original data satisfy constraints up to a small tolerance, the constraint violation of an unconstrained nonlinear model will be, in general, higher than the original data but still be relatively small overall. The constraint equations are solved to isolate a chosen variable and an unconstrained linear model can be created for and used to determine the outputs of the remaining variables. To improve performance the isolated variable can be the variable with highest variance. The chosen variable is then determined by using the values of the other variables from the unconstrained model substituted into the constraint equations. Therefore, the chosen variable will always have a value that ensures the constraint equations are satisfied. Since any constraint violation is minor and the chosen variable used to solve the constraints is large, the chosen variable will absorb all the error creating an accurate linear model. One can use any available software package or method to compute the unconstrained linear model from a dataset and no numerical optimization is needed. This modification will allow for the running time to be much faster and will ensure that a solution is always obtained.

Another method to maintain linearity as much as possible consists of a modification of the third method 600. As per the previous simplification, it is assumed that the original data satisfy constraints up to a small tolerance. The workflow of this method can be illustrated with the following nonlimiting example. Suppose a linear model satisfying mass balance is needed but the inputs and outputs of the model are not mass based variables. For instance, mass can be given as the product of volume and specific gravity. This will transform the linear mass balance equation into a nonlinear equation: the sum of the products of the volume and specific gravity of the inputs of a reaction must equal the sum of the products of the volume and specific gravity of the outputs of that reaction.

The first step of the method is to add the corresponding mass variables by multiplying the volume and specific gravity of each input and output. The next step is to fit a linear model for all variables of the data except for the largest volume variable and the associated mass variable. The mass balance constraint is linear with respect to these variables. The constraint equations are solved for the mass variables excluded from the linear model and using the unconstrained models for the included variables, a linear model for all mass variables can be obtained. Using the relationship that mass must be the product of volume and specific gravity, an almost linear model can be obtained for the volume mass variable also excluded from the linear model. Even though the linearity of the model for the last volume model cannot be guaranteed, a linear model can be created for all other variables. Moreover, the nonlinear volume model will be defined via linear models for the other variables.

A detailed mathematical background and example detailed derivation for an example embodiment of the fourth method is as follows. The following derivation describes how to obtain a linear model that respects mass balance where the data is not mass based but given as volume and specific gravity.

Before diving into the details, new notations need to be introduced. Let $Y^v = (y^{v,1}, \ldots, y^{v,N})$ denote the set of dependent variables that contain volume measurements. Here $y^{v,j} = (y_1^{v,j}, \ldots, y_m^{v,j}) \in \mathbb{R}^m$ is an m-dimensional vector for $j=1, \ldots, n$. To simplify the notation, use $(y_1^v, \ldots, y_m^v)$ to denote the different volume features independently of the data point. Similarly, $Y^g = (y^{g,1}, \ldots, y^{g,N})$ denotes the set of dependent variables that contain specific gravity measurements and $y^{g,j} = (y_1^{g,j}, \ldots, y_m^{g,j}) \in \mathbb{R}^m$ is an m-dimensional vector for $j=1, \ldots, n$ and $(y_1^g, \ldots, y_m^g)$ will denote the different specific gravity features independently of the data point.

In Chemical Engineering it is well known that mass equals the product of volume and specific gravity. Thus, a new set of dependent variables is defined by $y_j^w = y_j^v y_j^g$ which represents the mass (or weight) of each element in the chemical process or system. Using the above notations, the mass balance constraint equations can be written as follows:

$$0 = W - \sum_{i=1}^{m} y_i^\omega$$

where W represents the feed flow, that is the sum of all the independent variables that contain the mass of the feed flow. Without loss of generality $W = x_1 + \ldots + x_l$, for $1 \le l \le n$. Also assumed is that the original data satisfy the mass balance equation up to a small relative tolerance, that is:

$$100 \times \frac{W^j - \sum_{i=1}^{m} y_i^{\omega,j}}{W^j} < tol,$$

where tol (or tolerance) is usually less than 1% for, $j=1, \ldots, n$.

Assume, without loss of generality, that $y_m^v$ is the variable with highest variance. Using the notations and assumptions above, the derivation of the linear models of the Fourth method can be described as follows. The first step is to fit linear models for the following variables:

Mass Variables $y_i^\omega = \beta_1^{\omega,i} x_1 + \ldots + \beta_n^{\omega,i} x_n$, $i = 1, \ldots, m-1$, Volume Variables $y_i^v = \beta_1^{v,i} x_1 + \ldots + \beta_n^{v,i} x_n$, $i = 1, \ldots, m-1$, Specific gravity variables $y_i^g = \beta_1^{g,i} x_1 + \ldots + \beta_n^{g,i} x_n$, $i = 1, \ldots, m$.

The second step is to obtain a model for $y_m^v$ by substituting the already fitted linear models for the mass, volume and specific gravity variables into the mass balance constraint equations:

$$0 = W - \sum_{i=1}^{m} y_i^\omega = W - \sum_{i=1}^{m-1} y_i^\omega - y_m^\omega$$

$$= W - \sum_{i=1}^{m-1} \left(\beta_1^{\omega,i} x_1 + \ldots + \beta_n^{\omega,i} x_n\right) - y_m^\omega$$

The above equation can then be solved for $y_m^w$:

$$y_m^\omega = W - \sum_{i=1}^{m-1} \left(\beta_1^{\omega,i} x_1 + \ldots + \beta_n^{\omega,i} x_n\right)$$

$$= \left(1 - \sum_{i=1}^{m-1} \beta_1^{\omega_i}\right) x_1 + \ldots + \left(1 - \sum_{i=1}^{l} \beta_l^{\omega_i}\right) x_l +$$

$$\left(\sum_{i=1}^{l+1} \beta_{l+1}^{\omega_i}\right) x_{l+1} + \ldots + \left(\sum_{i=1}^{n} \beta_n^{\omega_i}\right) x_n$$

Thus, obtaining a linear model for $y_m^w$.

The last step is to obtain a model for $y_m^v$. Using the relationship $y_m^w = y_m^v y_m^g$, $y_m^v$ can be defined implicitly from the linear models of $y_m^w$ and $y_m^g$. That is, $$W - \sum_{i=1}^{m-1} \left(\beta_1^{\omega,i} x_1 + \ldots + \beta_n^{\omega,i} x_n\right) = y_m^\omega = y_m^v y_m^g = y_m^v (\beta_1^{g,m} x_1 + \ldots + \beta_n^{g,m} x_n).$$

In general, the model for $y_m^v$ will not be linear. However both models for $y_m^w$ and $y_m^g$ are linear, and therefore, the impact equation defining $y_m^v$ will be as simple as possible.

Figure 7:
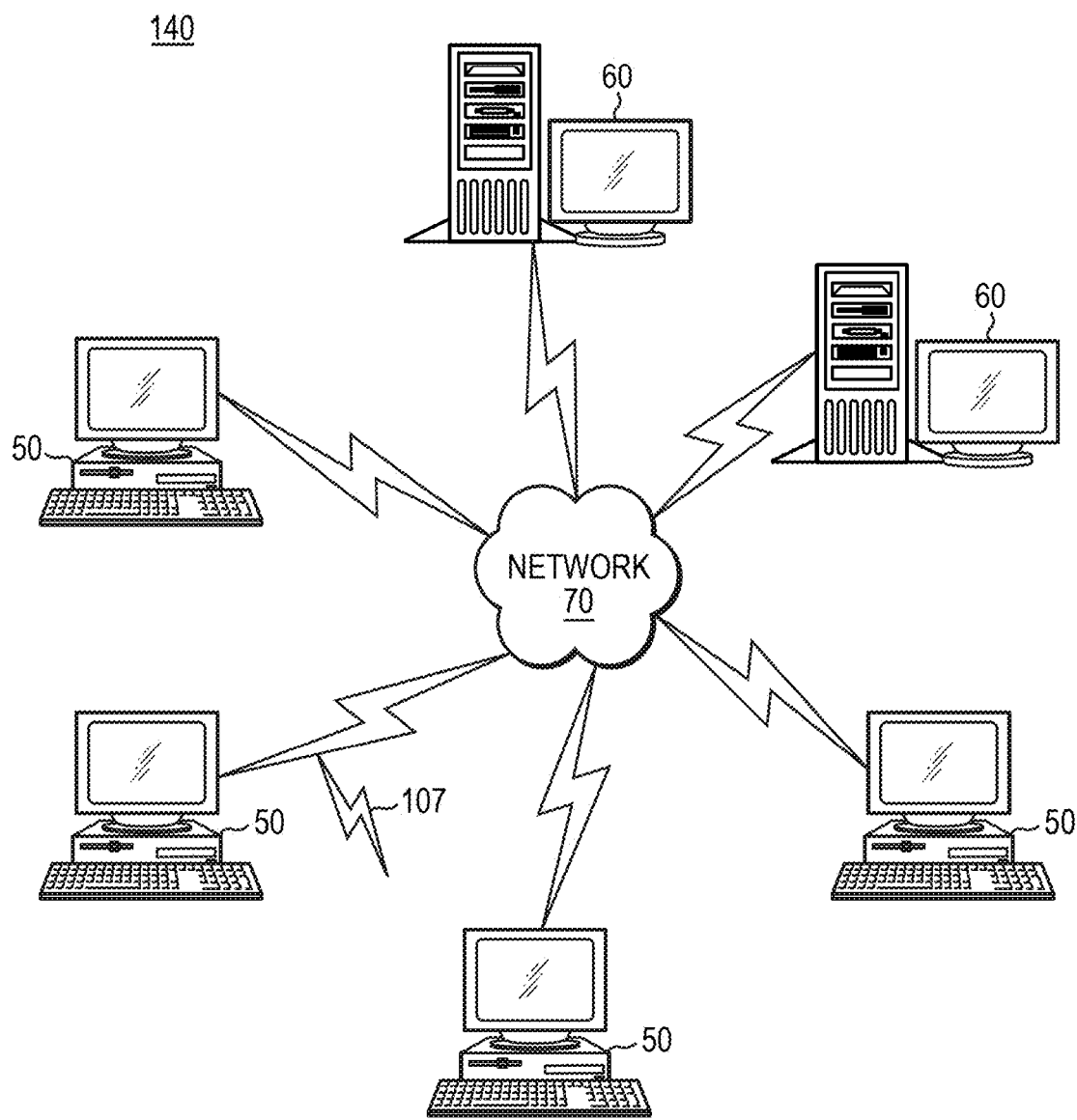
FIG. 7 is a schematic view of a computer network or similar digital processing environment in which embodiments of the present invention may be implemented.

Example implementations of a computing system and associated methods for incorporating constraint equations into linear regression models with the techniques described herein may be implemented in a software, firmware, or hardware environment. FIG. 7 illustrates a computer network or similar digital processing environment in which embodiments (e.g., system 140) of the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Client computers/devices 50 and server computer(s) 60 may execute any of the computation steps or processes of embodiments 200, 400, 600 of the invention including building coefficient matrices 223, building data reconciliation projection matrices 221, 421, performing projections 209, 409, performing numerical optimization 300, 608, building unconstrained and constrained objective functions 305, 605, 607, and/or performing any calculations or derivations described herein. Client computers/devices 50 and server computer(s) 60 may store any of the data utilized in the steps or processes of embodiments of the invention including data 201, 301, 401, 601, constraint equations 202, 302, 402, 602 utilized, determined constrained coefficients 210, 310, 410, 610, and/or models.

Figure 8:
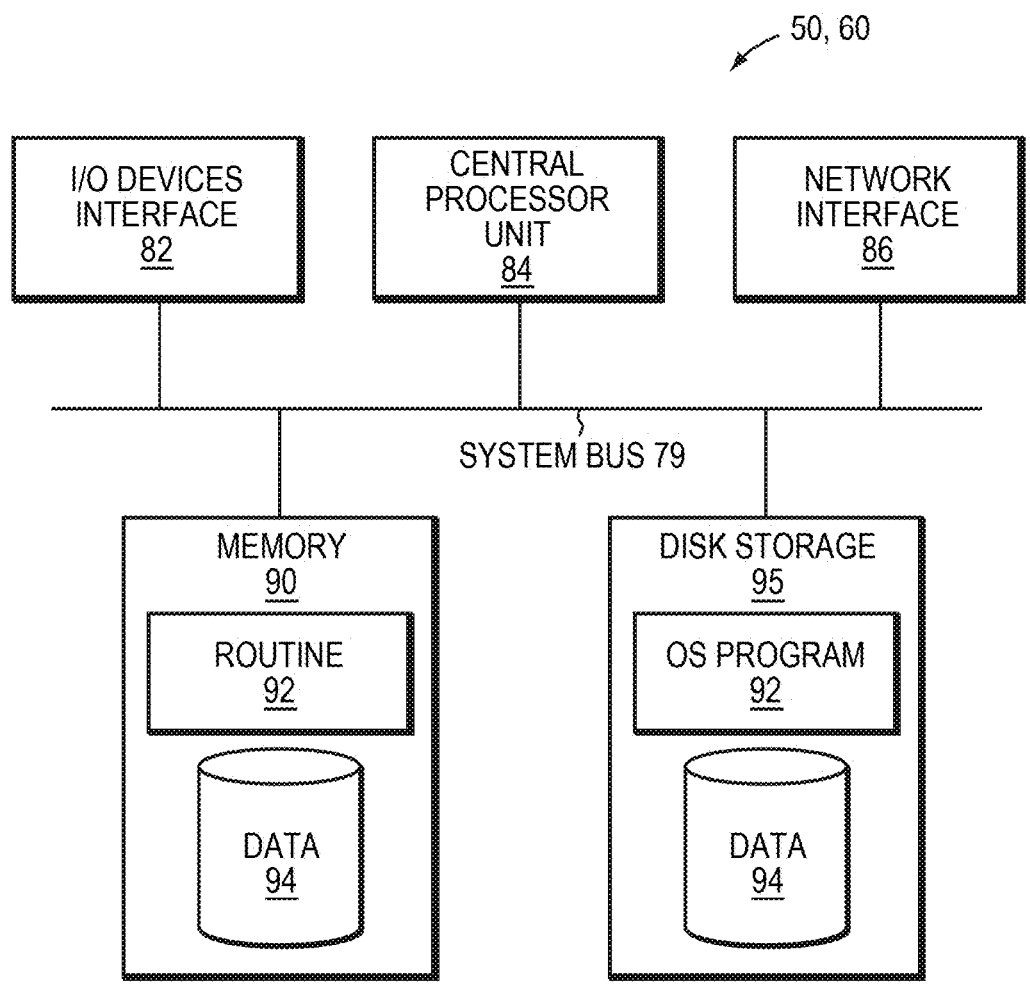
FIG. 8 is a block diagram of the internal structure of a computer (e.g., client processor/device or server computers) in the computer network of FIG. 7.

FIG. 8 is a diagram of the internal structure of a computer (e.g., client processor/device 50 or server computers 60) in the computer system of FIG. 7. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer 50, 60 to connect to various other devices attached to a network (e.g., network 70 of FIG. 7). Memory 90 provides volatile storage for computer software instructions 92 and data 94 used to implement an embodiment 140 of the present invention (e.g., modules used to complete workflows of methods 200, 300, 400, and 600). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, cloud storage, SD cards, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like. In other embodiments, the program product 92 may be implemented as a so-called Software as a Service (SaaS), or other installation or communication supporting end-users.

While example embodiments have been particularly shown and described, it will be understood by those skilled in the art that various changes in form and details may be made therein without departing from the scope of the embodiments encompassed by the appended claims.

What is claimed is:

1. A computer implemented method for generating an improved predictive model of an industrial process or process engineering system, the method comprising:
   receiving data representing a subject physics-based or chemistry-based process in an industrial plant, the received data including independent variables and dependent variables, and the receiving being performed by one or more digital processors;
   receiving, by the one or more processors, at least one linear equality constraint equation having constraint coefficients, the at least one linear constraint equation representing at least one physical property of the subject process;
   constructing a constraint matrix including the constraint coefficients, said constructing being automatically performed by the one or more processors;
   constructing, automatically by the one or more processors, a coefficient matrix including potential coefficients, the potential coefficients defining linear relations between the independent variables and the dependent variables of the received data;
   defining, as constrained coefficients, potential coefficients that make the product of the constraint matrix and the coefficient matrix zero, said defining being automatically performed by the one or more processors;
   generating an algebraic model for the received data, the algebraic model having model coefficients defining an algebraic relationship between the independent variables and the dependent variables, wherein the model coefficients are the constrained coefficients resulting from said defining, and wherein the generated algebraic model provides improved predictions of behavior of the subject process that satisfy the at least one physical property, and said generating being automatically performed by the one or more processors; and
   executing the generated algebraic model such that predictions of behavior of the subject process are produced and applied in the industrial plant.

2. The computer implemented method of claim 1 wherein the subject physics-based or chemistry-based process is any of: a chemical reaction, a transformation of interest of a processing system, a portion of an industrial process, operation of a production unit of the industrial plant, and operating physics of a specific piece of equipment in the industrial plant.

3. The computer implemented method of claim 1 wherein the industrial plant is one of a refinery, chemical manufacturing, pharmaceutical manufacturing, personal and home care manufacturing, nutrition manufacturing, or similar process industry facility.

4. The computer implemented method of claim 1 wherein the generated model is automatically executed and used for process control of the subject process at the industrial plant.

5. The computer implemented method of claim 1 wherein the generated model is executed and used in real-time optimization, on-line optimization, or offline optimization of the subject process.

6. The computer implemented method of claim 1 wherein the generated model is executed and used to design the subject process.

7. The computer implemented method of claim 1 wherein the generated model is a linear model and is generated using at least one of an ordinary least squares regression, ridge regression, LASSO regression, partial least squares regression, or elastic net regression.

8. The computer implemented method of claim 1 wherein the coefficient matrix is a vertical block matrix having (i) an identity matrix as an upper block, and (ii) a matrix composed of the potential coefficients as a lower block.

9. The computer implemented method of claim 1 wherein the model coefficients are determined directly using Lagrange multipliers.

10. The computer implemented method of claim 9 wherein the model coefficients are solutions of the equation:

$$\begin{pmatrix} I_n \\ \beta_C \end{pmatrix} = \left( I_{n+m} - \hat{\Gamma} G^T (G \hat{\Gamma} G^T)^{-1} G \right) \begin{pmatrix} I_n \\ \beta_{UC} \end{pmatrix},$$

where $B_C$ is a matrix of the model coefficients; I is the identity matrix; n is the number of independent variables; m is the number of dependent variables; $\Gamma$ is a diagonal matrix with positive or zero entries; G is the constraint matrix; $^T$ denotes a matrix transpose; and $B_{UC}$ is a matrix of coefficients of an unconstrained linear model of the received data.

11. The computer implemented method of claim 1 wherein the model coefficients are determined using a numerical optimizer.

12. The computer implemented method of claim 1 wherein the at least one physical property includes a mass balance.

13. The computer implemented method of claim 1 wherein the at least one physical property includes an energy balance.

14. The computer implemented method of claim 1 wherein the at least one physical property includes a gain constraint for a process control system.

15. The computer implemented method of claim 1 further comprising:
    by the one of more processors:
    receiving at least one almost-linear constraint equation;
    determining an unconstrained algebraic model of the received data;
    automatically identifying, using the unconstrained algebraic model, at least one of the independent and dependent variables to fix; and
    creating the at least one linear constraint equation using the received at least one almost-linear constraint equation and the identified at least one variable in a fixed state, the created at least one linear constraint equation representing the at least one physical property.

16. The computer implemented method of claim 15 wherein the at least one almost-linear constraint equation is an atom balance constraint.

17. The computer implemented method of claim 15 wherein the at least one almost-linear constraint equation is an energy constraint.

18. A computer implemented method for generating an improved predictive model of a process system, the method comprising:
- receiving data representing a process system in an industrial plant, the received data including independent variables and dependent variables, said receiving being by one or more digital processors;
- building an objective function configured to determine a linear model for the received data, said building being automatically performed by the one or more processors;
- receiving, by the one or more processors, at least one constraint equation, the at least one constraint equation representing at least one physical property of the process system;
- constructing, by the one or more processors, a numerical optimization problem whose input is based on a combination of the objective function and the received at least one constraint equation;
- generating an algebraic model having sets of model coefficients defining an algebraic relationship between the independent variables and each dependent variable, wherein the model coefficients are solutions of the numerical optimization problem, and wherein the generated model provides improved predictions of behavior of the process system that satisfy the at least one physical property, said generating being automatically performed by the one or more processors; and
- executing the generated model such that predictions of behavior of the process system are produced and applied in the industrial plant.

19. The computer implemented method of claim 18 wherein the process system is any of: a chemical reaction, a transformation of interest of a processing system, a portion of an industrial process, operation of a production unit of the industrial plant, and operating physics of a specific piece of equipment in the industrial plant.

20. The computer implemented method of claim 18 wherein the industrial plant is one of a refinery, chemical manufacturing, pharmaceutical manufacturing, personal and home care manufacturing, nutrition manufacturing, or similar process industry facility.

21. The computer implemented method of claim 18 wherein the generated model is automatically executed and used for process control of the process system at the industrial plant.

22. The computer implemented method of claim 18 wherein the generated model is executed and used in real-time optimization, on-line optimization, or offline optimization of the process system.

23. The computer implemented method of claim 18 wherein the generated model is executed and used to design the process system.

24. The computer implemented method of claim 18 wherein the objective function an ordinary least squares regression, a ridge regression a LASSO regression, a partial least square regression, or an elastic net regression.

25. The computer implemented method of claim 18 wherein the at least one constraint equation is an atom balance constraint.

26. The computer implemented method of claim 18 wherein the at least one constraint equation is an energy constraint.

27. The computer implemented method of claim 18 wherein the at least one constraint equation is a control loop gain constraint.

28. The computer implemented method of claim 18 wherein constructing the numerical optimization problem further comprises:
- solving the received at least one constraint equation for at least one chosen dependent variable; and
- substituting the at least one chosen dependent variable in the objective function with the solved at least one constraint equation to create a constrained objective function, such that input to the
- numerical optimization problem includes the created constrained objective function,
- wherein the generated model is a linear model.

29. The computer implemented method of claim 28 further comprising choosing the dependent variable with the highest variance as the at least one chosen dependent variable.

30. The computer implemented method of claim 18 wherein constructing the numerical optimization problem further comprises:
- substituting linear expressions of the dependent variables into the received at least one constraint equation; and
- deriving coefficients for the independent variables in the substituted at least one constraint equation, such that inputs to the constructed numerical optimization problem include the objective function and the derived coefficients for the independent variables equal to zero.

31. A computer implemented method for generating an improved predictive model of a process system, the method comprising:
- receiving data representing a process system in an industrial plant, the received data including independent variables and dependent variables, said receiving being by one or more processors;
- receiving, by the one or more processors, at least one constraint equation, the at least one constraint equation representing at least one physical property of the process system;
- determining at least one chosen dependent variable, said determining being responsively performed by the one or more processors;
- generating a linear model for the received data excluding the determined at least one chosen dependent variable, said generating being automatically performed by the one or more processors;
- solving the received at least one constraint equation for the determined at least one chosen dependent variable, said solving being automatically performed by the one or more processors;
- forming a model for the at least one chosen dependent variable using the solved at least one constraint equation and the generated linear model for the received data excluding the at least one chosen dependent variable, said forming being automatically performed by the one or more processors;
- generating an algebraic model comprised of the formed model for the at least one chosen dependent variable and the generated linear model for the received data excluding the at least one chosen dependent variable, the generated algebraic model providing improved predictions of behavior of the process system that satisfy the at least one physical property, said generating the algebraic model being automatically performed by the one or more processors; and
- executing the generated algebraic model such that predictions of behavior of the process system are produced and applied in the industrial plant.

32. The computer implemented method of claim 31 wherein the at least one constraint equation is a sum of products.

33. The computer implemented method of claim 32 wherein the at least one constraint equation is a mass balance equation where mass is given as a product of volume and specific gravity.

34. The computer implemented method of claim 33 wherein the at least one chosen dependent variable is a largest volume variable.

35. A computer-based modeling system that generates an improved predictive model of an industrial process, the system comprising:
    a processor; and
    a process modeler executable by the processor and configured to:
        receive data representing a subject physics-based or chemistry-based process in an industrial plant, the received data including independent variables and dependent variables;
        receive at least one linear equality constraint equation having constraint coefficients, the at least one linear constraint equation representing at least one physical property of the subject process;
        automatically construct a constraint matrix including the constraint coefficients;
        automatically construct a coefficient matrix including potential coefficients, the potential coefficients defining linear relations between the independent variables and the dependent variables of the received data;
        responsively define, as constrained coefficients, the potential coefficients that make the product of the constraint matrix and the coefficient matrix zero; and
        automatically generate an algebraic model for the received data, the algebraic model having model coefficients defining an algebraic relationship between the independent variables and the dependent variables, wherein the model coefficients are constrained coefficients resulting from said defining, and wherein the generated model, upon execution, provides improved predictions of behavior of the subject process that satisfy the at least one physical property.

36. A non-transitory computer program product for generating an improved predictive model of an industrial process, the computer program product comprising:
    a computer-readable medium with computer code instructions stored thereon, the computer code instructions, when executed by a processor, causing an apparatus associated with the processor to:
    receive data representing a subject physics-based or chemistry-based process in an industrial plant, the received data having independent variables and dependent variables;
    receive at least one linear equality constraint equation having constraint coefficients, the at least one linear constraint equation representing at least one physical property of the subject process;
    construct a constraint matrix including the constraint coefficients;
    construct a coefficient matrix including potential coefficients, the potential coefficients defining linear relations between the independent variables and the dependent variables of the received data;
    define, as constrained coefficients, the potential coefficients that make the product of the constraint matrix and the coefficient matrix zero; and
    generate an algebraic model for the received data, the generated model having model coefficients defining an algebraic relationship between the independent variables and the dependent variables of the received data, wherein the model coefficients are the constrained coefficients resulting from the defining, and wherein the generated model provides improved predictions of behavior of the subject process that satisfy the at least one physical property.

* * * * *